(12) United States Patent
Yadav et al.

(10) Patent No.: US 10,020,989 B2
(45) Date of Patent: *Jul. 10, 2018

(54) PROVISIONING SERVICES IN LEGACY MODE IN A DATA CENTER NETWORK

(71) Applicant: Cisco Technology, Inc., San Jose, CA (US)

(72) Inventors: Navindra Yadav, Cupertino, CA (US); Sameer Merchant, Sunnyvale, CA (US); Pirabhu Raman, San Jose, CA (US); Amit Jain, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,752

(22) Filed: Jun. 30, 2016

(65) Prior Publication Data

US 2016/0315811 A1    Oct. 27, 2016

Related U.S. Application Data

(63) Continuation of application No. 14/486,828, filed on Sep. 15, 2014, now Pat. No. 9,407,501.

(60) Provisional application No. 61/900,372, filed on Nov. 5, 2013.

(51) Int. Cl.
*H04L 12/28* (2006.01)
*H04L 12/24* (2006.01)
*H04L 12/743* (2013.01)
*H04L 12/803* (2013.01)

(Continued)

(52) U.S. Cl.
CPC ...... *H04L 41/0806* (2013.01); *H04L 41/0889* (2013.01); *H04L 41/12* (2013.01); *H04L 41/5048* (2013.01); *H04L 41/5054* (2013.01); *H04L 43/045* (2013.01); *H04L 45/7453* (2013.01); *H04L 47/125* (2013.01); *H04L 47/21* (2013.01)

(58) Field of Classification Search
None
See application file for complete search history.

(56) References Cited

U.S. PATENT DOCUMENTS

| | | |
|---|---|---|
| 4,298,770 A | 11/1981 | Nishihara et al. |
| 4,636,919 A | 1/1987 | Itakura et al. |
| 4,700,016 A | 10/1987 | Hitchcock et al. |

(Continued)

FOREIGN PATENT DOCUMENTS

WO    WO 2014/071996    5/2014

*Primary Examiner* — Anh-Vu Ly
(74) *Attorney, Agent, or Firm* — Polsinelli PC

(57) ABSTRACT

An administrator can define or modify one or more service graphs. Next, the administrator can register service appliances along with their device package files with a controller. Then, the controller can establish the capabilities of the service devices, and classify the service devices as legacy or service tag switching (STS) capable devices. Then, the controller can create one or more instances of the service graph, by populating the service nodes into the service graph. Then, the application owner can attach their endpoint groups (EPGs) to the service graphs created by the administrator. Then, a service in the network can be automatically provisioned using the service graph to configure one or more nodes in an associated service chain of the service according to information in the service graph.

19 Claims, 9 Drawing Sheets

(51) Int. Cl.
*H04L 12/819* (2013.01)
*H04L 12/26* (2006.01)

(56) References Cited

U.S. PATENT DOCUMENTS

| | | | |
|---|---|---|---|
| 5,859,835 A | 1/1999 | Varma et al. | |
| 5,926,458 A | 7/1999 | Yin et al. | |
| 6,389,031 B1 | 5/2002 | Chao et al. | |
| 6,677,831 B1 | 1/2004 | Cheng et al. | |
| 6,714,553 B1 | 3/2004 | Poole et al. | |
| 6,757,897 B1 | 6/2004 | Shi et al. | |
| 6,876,952 B1 | 4/2005 | Kappler et al. | |
| 6,907,039 B2 | 6/2005 | Shen | |
| 6,941,649 B2 | 9/2005 | Goergen | |
| 6,952,421 B1 | 10/2005 | Slater | |
| 6,954,463 B1 | 10/2005 | Ma et al. | |
| 6,996,099 B1 | 2/2006 | Kadambi et al. | |
| 7,152,117 B1 | 12/2006 | Stapp et al. | |
| 7,177,946 B1 | 2/2007 | Kaluve et al. | |
| 7,372,857 B1 | 5/2008 | Kappler et al. | |
| 7,411,915 B1 | 8/2008 | Spain et al. | |
| 7,426,604 B1 | 9/2008 | Rygh et al. | |
| 7,630,368 B2 | 12/2009 | Tripathi et al. | |
| 7,729,296 B1 | 6/2010 | Choudhary | |
| 7,826,469 B1 | 11/2010 | Li et al. | |
| 8,302,301 B2 | 11/2012 | Lau | |
| 8,325,459 B2 | 12/2012 | Mutnury et al. | |
| 8,339,973 B1 | 12/2012 | Pichumani et al. | |
| 8,687,629 B1 | 4/2014 | Kompella et al. | |
| 8,868,766 B1 | 10/2014 | Theimer et al. | |
| 9,203,188 B1 | 12/2015 | Siechen et al. | |
| 9,258,195 B1 | 2/2016 | Pendleton et al. | |
| 9,374,294 B1 | 6/2016 | Pani | |
| 9,397,946 B1 | 7/2016 | Yadav | |
| 9,402,470 B2 | 8/2016 | Shen et al. | |
| 9,407,501 B2 * | 8/2016 | Yadav | H04L 41/0806 370/389 |
| 9,433,081 B1 | 8/2016 | Xiong et al. | |
| 9,444,634 B2 | 9/2016 | Pani | |
| 9,502,111 B2 | 11/2016 | Dharmapurikar et al. | |
| 9,509,092 B2 | 11/2016 | Shen et al. | |
| 9,544,224 B2 | 1/2017 | Chu et al. | |
| 9,590,914 B2 | 3/2017 | Attar et al. | |
| 9,627,063 B2 | 4/2017 | Dharmapurikar et al. | |
| 9,634,846 B2 | 4/2017 | Pani | |
| 9,635,937 B2 | 5/2017 | Shen et al. | |
| 9,654,300 B2 | 5/2017 | Pani | |
| 9,654,385 B2 | 5/2017 | Chu et al. | |
| 9,654,409 B2 | 5/2017 | Yadav et al. | |
| 9,655,232 B2 | 5/2017 | Saxena et al. | |
| 9,667,431 B2 | 5/2017 | Pani | |
| 9,667,551 B2 | 5/2017 | Edsall et al. | |
| 9,674,086 B2 | 6/2017 | Ma et al. | |
| 9,686,180 B2 | 6/2017 | Chu et al. | |
| 9,698,994 B2 | 7/2017 | Pani | |
| 9,716,665 B2 | 7/2017 | Attar et al. | |
| 9,742,673 B2 | 8/2017 | Banerjee et al. | |
| 9,755,965 B1 | 9/2017 | Yadav et al. | |
| 2002/0126671 A1 | 9/2002 | Ellis et al. | |
| 2002/0146026 A1 | 10/2002 | Unitt et al. | |
| 2003/0035385 A1 | 2/2003 | Walsh et al. | |
| 2003/0067924 A1 | 4/2003 | Choe et al. | |
| 2003/0097461 A1 | 5/2003 | Barham et al. | |
| 2003/0115319 A1 | 6/2003 | Dawson et al. | |
| 2003/0137940 A1 | 7/2003 | Schwartz et al. | |
| 2003/0174650 A1 | 9/2003 | Shankar et al. | |
| 2003/0231646 A1 | 12/2003 | Chandra et al. | |
| 2004/0062259 A1 | 4/2004 | Jeffries et al. | |
| 2004/0073715 A1 | 4/2004 | Folkes et al. | |
| 2004/0100901 A1 | 5/2004 | Bellows | |
| 2004/0103310 A1 | 5/2004 | Sobel et al. | |
| 2004/0160956 A1 | 8/2004 | Hardy et al. | |
| 2004/0249960 A1 | 12/2004 | Hardy et al. | |
| 2005/0007961 A1 | 1/2005 | Scott et al. | |
| 2005/0013280 A1 | 1/2005 | Buddhikot et al. | |
| 2005/0175020 A1 | 8/2005 | Park et al. | |
| 2005/0207410 A1 | 9/2005 | Adhikari et al. | |
| 2006/0028285 A1 | 2/2006 | Jang et al. | |
| 2006/0031643 A1 | 2/2006 | Figueira | |
| 2006/0198315 A1 | 9/2006 | Sasagawa et al. | |
| 2006/0209688 A1 | 9/2006 | Tsuge et al. | |
| 2006/0221835 A1 | 10/2006 | Sweeney | |
| 2006/0250982 A1 | 11/2006 | Yuan et al. | |
| 2006/0268742 A1 * | 11/2006 | Chu | H04L 41/12 370/254 |
| 2006/0280179 A1 | 12/2006 | Meier | |
| 2007/0025241 A1 | 2/2007 | Nadeau et al. | |
| 2007/0223372 A1 | 9/2007 | Haalen et al. | |
| 2007/0274229 A1 | 11/2007 | Scholl et al. | |
| 2007/0280264 A1 | 12/2007 | Milton et al. | |
| 2008/0031130 A1 | 2/2008 | Raj et al. | |
| 2008/0031247 A1 | 2/2008 | Tahara et al. | |
| 2008/0092213 A1 | 4/2008 | Wei et al. | |
| 2008/0147830 A1 | 6/2008 | Ridgill et al. | |
| 2008/0151863 A1 | 6/2008 | Lawrence et al. | |
| 2008/0177896 A1 * | 7/2008 | Quinn | G06F 9/5055 709/238 |
| 2008/0225853 A1 | 9/2008 | Melman et al. | |
| 2008/0310421 A1 | 12/2008 | Teisberg et al. | |
| 2009/0094357 A1 | 4/2009 | Keohane et al. | |
| 2009/0122805 A1 | 5/2009 | Epps et al. | |
| 2009/0188711 A1 | 7/2009 | Ahmad | |
| 2009/0193103 A1 | 7/2009 | Small et al. | |
| 2009/0232011 A1 | 9/2009 | Li et al. | |
| 2009/0268614 A1 | 10/2009 | Tay et al. | |
| 2010/0128619 A1 | 5/2010 | Shigei | |
| 2010/0150155 A1 | 6/2010 | Napierala | |
| 2010/0191813 A1 | 7/2010 | Gandhewar et al. | |
| 2010/0191839 A1 | 7/2010 | Gandhewar et al. | |
| 2010/0223655 A1 | 9/2010 | Zheng | |
| 2010/0287227 A1 | 11/2010 | Goel et al. | |
| 2010/0299553 A1 | 11/2010 | Cen | |
| 2010/0312875 A1 | 12/2010 | Wilerson et al. | |
| 2011/0110241 A1 | 5/2011 | Atkinson et al. | |
| 2011/0138310 A1 | 6/2011 | Gomez et al. | |
| 2011/0158248 A1 | 6/2011 | Vorunganti et al. | |
| 2011/0170426 A1 | 7/2011 | Kompella et al. | |
| 2011/0203834 A1 | 8/2011 | Yoneya et al. | |
| 2011/0228795 A1 | 9/2011 | Agrawal et al. | |
| 2011/0249682 A1 | 10/2011 | Kean et al. | |
| 2011/0286447 A1 | 11/2011 | Liu | |
| 2011/0299406 A1 | 12/2011 | Vobbilisetty et al. | |
| 2011/0310738 A1 | 12/2011 | Lee et al. | |
| 2011/0321031 A1 | 12/2011 | Dournov et al. | |
| 2012/0007688 A1 | 1/2012 | Zhou et al. | |
| 2012/0063318 A1 | 3/2012 | Boddu et al. | |
| 2012/0102114 A1 | 4/2012 | Dunn et al. | |
| 2012/0163396 A1 | 6/2012 | Cheng et al. | |
| 2012/0275304 A1 | 11/2012 | Patel et al. | |
| 2012/0281697 A1 | 11/2012 | Huang | |
| 2012/0300787 A1 | 11/2012 | Korger | |
| 2013/0055155 A1 | 2/2013 | Wong et al. | |
| 2013/0090014 A1 | 4/2013 | Champion | |
| 2013/0097335 A1 | 4/2013 | Jiang et al. | |
| 2013/0124708 A1 | 5/2013 | Lee et al. | |
| 2013/0182712 A1 | 7/2013 | Aguayo et al. | |
| 2013/0250951 A1 | 9/2013 | Koganti | |
| 2013/0311663 A1 | 11/2013 | Kamath et al. | |
| 2013/0311991 A1 | 11/2013 | Li et al. | |
| 2013/0322258 A1 | 12/2013 | Nedeltchev et al. | |
| 2013/0322446 A1 | 12/2013 | Biswas et al. | |
| 2013/0322453 A1 | 12/2013 | Allan | |
| 2013/0332399 A1 | 12/2013 | Reddy et al. | |
| 2013/0332577 A1 | 12/2013 | Nakil et al. | |
| 2013/0332602 A1 | 12/2013 | Nakil et al. | |
| 2014/0016501 A1 | 1/2014 | Kamath et al. | |
| 2014/0047264 A1 | 2/2014 | Wang et al. | |
| 2014/0056298 A1 | 2/2014 | Vobbilisetty et al. | |
| 2014/0068750 A1 | 3/2014 | Tjahjono et al. | |
| 2014/0086253 A1 | 3/2014 | Yong et al. | |
| 2014/0105039 A1 | 4/2014 | McDysan | |
| 2014/0105062 A1 | 4/2014 | McDysan et al. | |
| 2014/0105216 A1 | 4/2014 | McDysan | |
| 2014/0146817 A1 | 5/2014 | Zhang | |

(56) References Cited

U.S. PATENT DOCUMENTS

| | | |
|---|---|---|
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0269712 A1 | 9/2014 | Kidambi |
| 2014/0307744 A1* | 10/2014 | Dunbar .................. H04L 45/44 370/401 |
| 2014/0321277 A1 | 10/2014 | Lynn, Jr. et al. |
| 2014/0334295 A1 | 11/2014 | Guichard et al. |
| 2014/0341029 A1* | 11/2014 | Allan .................... H04L 47/125 370/235 |
| 2014/0372582 A1 | 12/2014 | Ghanwani et al. |
| 2015/0009992 A1 | 1/2015 | Zhang |
| 2015/0092551 A1 | 4/2015 | Moisand et al. |
| 2015/0092593 A1 | 4/2015 | Kompella |
| 2015/0113143 A1 | 4/2015 | Stuart et al. |
| 2015/0124629 A1 | 5/2015 | Pani |
| 2015/0124633 A1 | 5/2015 | Banerjee et al. |
| 2015/0124640 A1 | 5/2015 | Chu et al. |
| 2015/0124644 A1 | 5/2015 | Pani |
| 2015/0124806 A1 | 5/2015 | Banerjee et al. |
| 2015/0124821 A1 | 5/2015 | Chu et al. |
| 2015/0124823 A1 | 5/2015 | Pani et al. |
| 2015/0124824 A1 | 5/2015 | Edsall et al. |
| 2015/0124825 A1 | 5/2015 | Dharmapurikar et al. |
| 2015/0124833 A1 | 5/2015 | Ma et al. |
| 2015/0236900 A1 | 8/2015 | Chung |
| 2015/0378712 A1 | 12/2015 | Cameron et al. |
| 2015/0378969 A1 | 12/2015 | Powell et al. |
| 2016/0119204 A1 | 4/2016 | Murasato et al. |
| 2017/0085469 A1 | 3/2017 | Chu et al. |
| 2017/0207961 A1 | 7/2017 | Saxena et al. |
| 2017/0214619 A1 | 7/2017 | Chu et al. |
| 2017/0237651 A1 | 8/2017 | Pani |
| 2017/0237678 A1 | 8/2017 | Ma et al. |
| 2017/0250912 A1 | 8/2017 | Chu et al. |

* cited by examiner

PROVISIONING SERVICES IN LEGACY MODE IN A DATA CENTER NETWORK

CROSS REFERENCE TO RELATED APPLICATION

This application is a continuation of U.S. patent application Ser. No. 14/486,828, filed Sep. 15, 2014, which claims priority to U.S. Provisional Patent Application No. 61/900,372, filed Nov. 5, 2013; all of which are incorporated herein by reference in their entirety.

TECHNICAL FIELD

The present technology pertains to provisioning services in a data center network, and more specifically pertains to automating the commissioning and decommissioning of application and the service configuration on one or more service nodes.

BACKGROUND

Service deployment can be a tedious process and can often be prone to errors. Deployment of a new application in a data center can require provisioning of computers, storage, and networking resources. However, service deployment, in particular automation and enabling of services, can be onerous and often takes very long time—often weeks or months (as compared to the other steps requiring less than a couple of days). In addition when an application has to be decommissioned, there are typically no easy ways to figure out what needs to be "un-configured" from the service nodes. Many organizations have to deal with such scenarios.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXEMPLARY EMBODIMENTS

Figure 1:
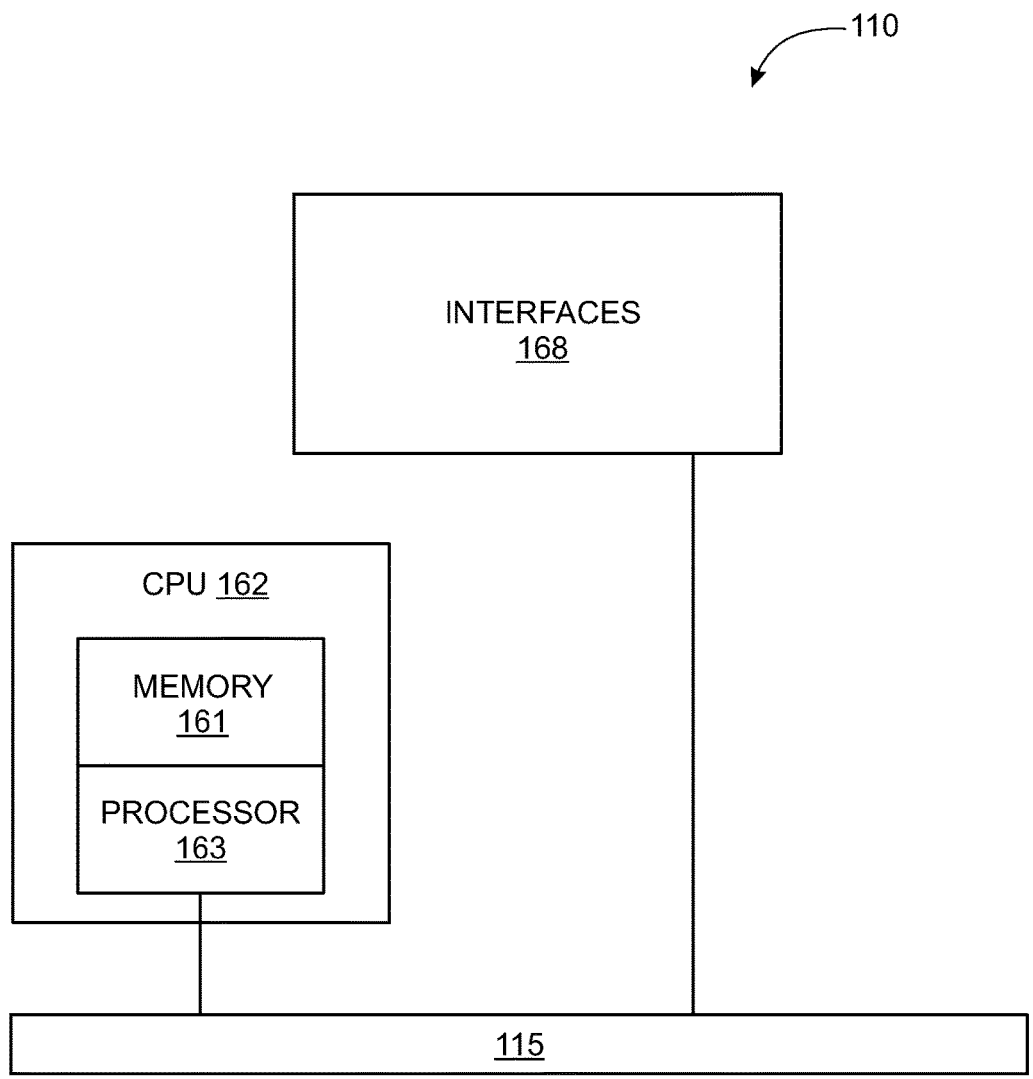
FIG. 1 illustrates an exemplary network device in accordance with an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

An infrastructure admin or administrator can define or modify one or more service graphs for outlining service chains and provisioning services in a network. The service graphs can include nodes in the network associated with service applications. Next, the infrastructure admin or administrator can register service appliances, such as firewalls, load balancers, intrusion detection devices, cache engines, application delivery controllers, intrusion prevention devices, etc., along with their device package files with a controller (e.g., a network controller or a fabric controller) on the network. The device package files can include data about the device, such as data which specifies the device's functionality, capabilities, configuration or settings, hardware resources, software resources, status, etc. For example, the device package files can indicate specific hardware and software capabilities of one or more devices or nodes. In some embodiments, the device package files can define the functionalities of the nodes in the service graph, such as forwarding functionalities, load balancing functionalities, configuration information, etc. Moreover, in some cases, the device package files can include a file, such as an extensible markup language (XML) file, defining the various features and configurations of the devices or nodes in the service graph.

Then, the controller can establish the capabilities of the service devices, and classify the service devices as legacy or service tag switching (STS) capable devices. Legacy service and STS capable devices can both implement the automated provisioning here without requiring additional software or patches to be installed on the devices. However, the information indicating legacy or STS capable can be used to understand the capabilities of the devices and consequently adjust the configurations, rules and/or implementations used in provisioning the services.

Then, the controller can create one or more instances of the service graph by populating the service nodes into the service graph. This can allow the controller to understand the devices or nodes used by a client and service application and/or understand the service chain. The resulting service graph can thus outline the service nodes in the network, as well as their respective capabilities, functionalities, and/or configuration.

Then, an application owner can attach an endpoint group (EPG) to one or more service graphs created by the infrastructure admin or administrator. For example, the application owner can attach an EPG to a service chain in a service graph created by the administrator. The EPGs in the service graph can be represented by a specific route, label, or address, for example. Moreover, the application owner can include specific details about the attached EPG, such as a tag, information about an application group, routing information, policy information, network segment or tenant space information, etc. The service graph and attached EPGs can then be used to provision services and deploying applications dynamically and/or automatically while minimizing or avoiding downtime. For example, in some cases, an EPG can be attached to a specific service node in the service graph, such as a terminal node (e.g., node corresponding to the destination EPG or source EPG). In some cases, the remaining service nodes can be defined as function nodes to identify their particular role within the service provisioning chain.

In some aspects, service provisioning can include various components, such as dynamic network configuration and dynamic service configuration. All nodes in the service graph can be automatically configured with respect to networking requirements and the services provided. The device package information for each node in the graph, as well as various rules or policies can be used to determine the configuration for each node along a service chain in the service graph. This way, resources and services can be automatically provisioned on the network, with each relevant node in the service chain and any configuration settings in the network being automatically configured and integrated to avoid service downtime and/or tedious and unnecessary planning efforts.

Description

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for automatic provisioning of services when a client is accessing an application. Disclosed are systems, methods, and computer-readable storage media for populating one or more service graphs used in automating the provisioning of services. A brief introductory description of exemplary systems and networks, as illustrated in FIGS. 1 through 3, is disclosed herein. A detailed description of FIGS. 4-9, related concepts, and exemplary variations, will then follow. These variations shall be described herein as the various embodiments are set forth. The disclosure now turns to FIG. 1.

FIG. 1 illustrates an exemplary network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2B:
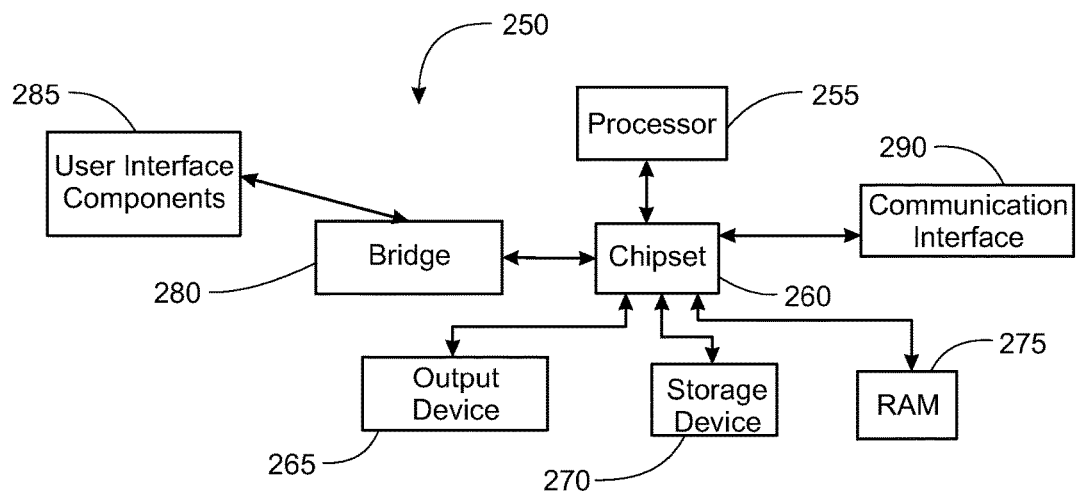
FIGS. 2A and 2B illustrate example system embodiments according to some aspects of the subject technology.
Figure 2A:
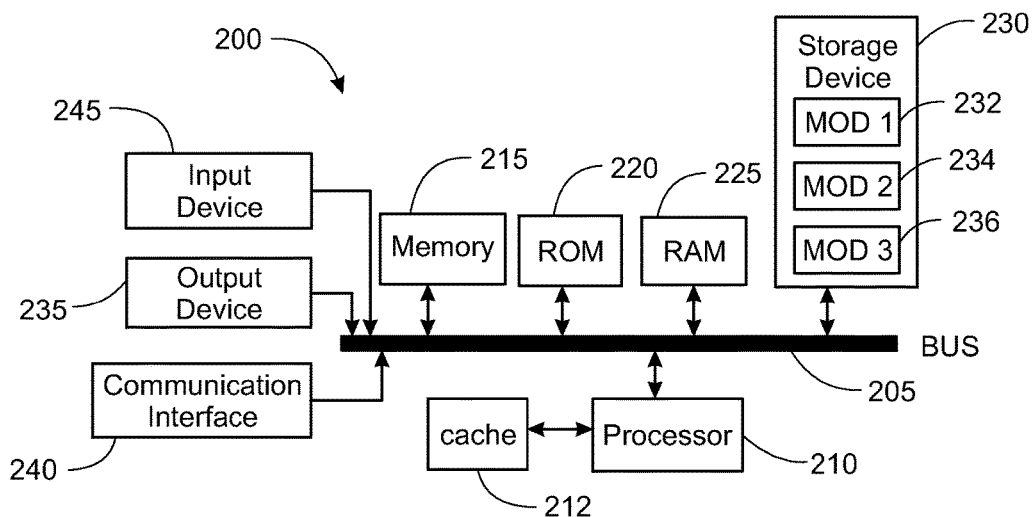
Figure 3:
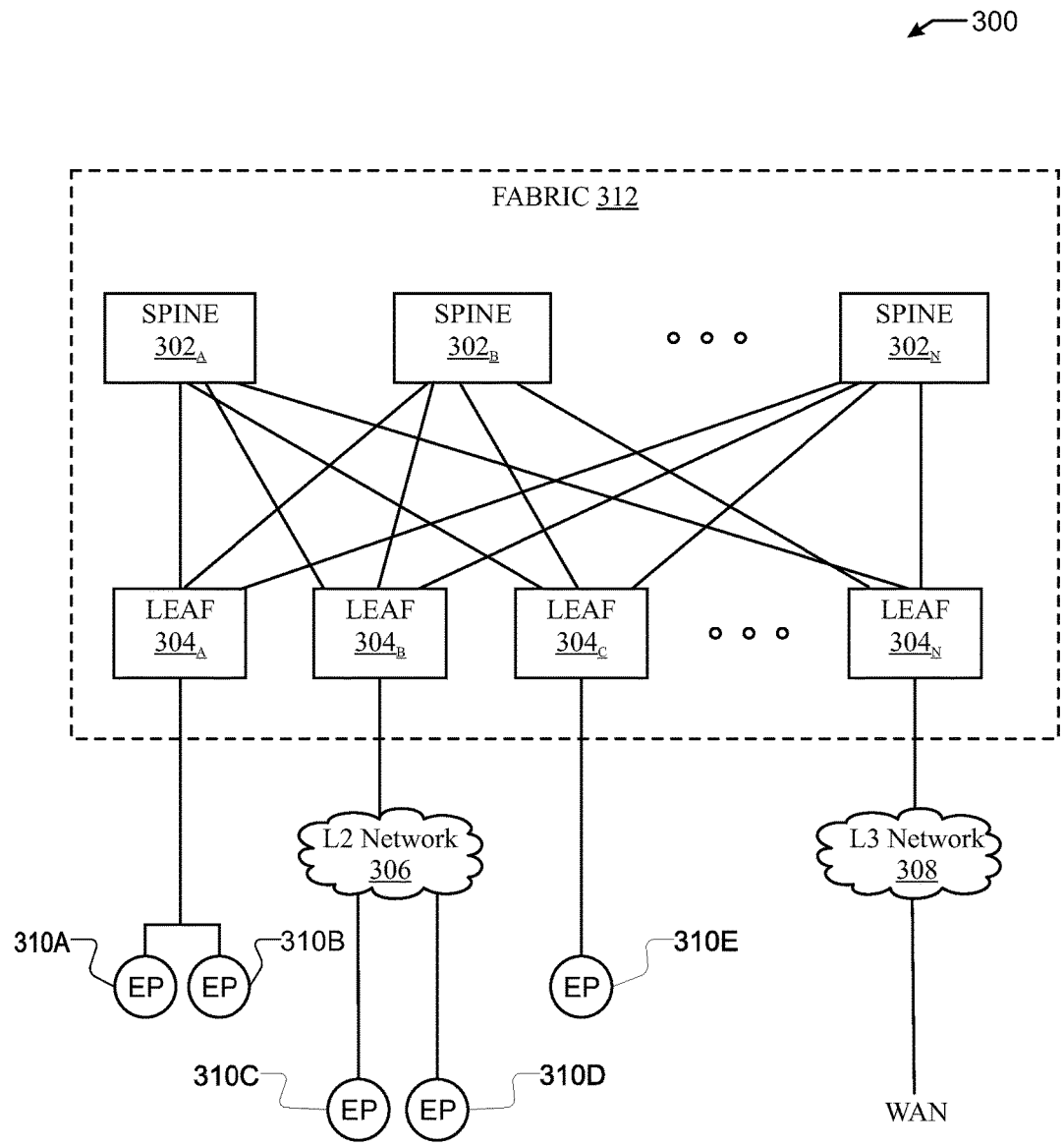
FIG. 3 illustrates a schematic block diagram of an example architecture for a network fabric.

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

FIG. 3 illustrates a schematic block diagram of an example architecture 300 for a network fabric 312. The network fabric 312 can include spine switches $302_A$, $302_B$, . . . , $302_N$ (collectively "302") connected to leaf switches $304_A$, $304_B$, $304_C$, . . . , $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can lookup the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, a client device, etc. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

Example Embodiments

The above mechanism can allow the networking part of the services to be "auto" (automated) provisioned by a machine. The mechanism can work with existing service nodes which do not need to be aware of any of the service improvements that have been made in a network fabric. Examples of the services or service appliances in the network can include, but are not limited to, firewalls (FWs), Intrusion Prevention Devices (IPS), Intrusion Detection Devices (IDS), Application Delivery Controllers (ADCs) Server Load Balancers (SLBs), Cache Engines and compliance analysis engines. Moreover, the services and service appliances can be hardware based, such as a hardware firewall; software based, such as a virtual load balancer; or both.

Further, the mechanism can provide automatic provisioning of services; reduce the operational expenditure (OPEX) and time to provision a new application in a network, such as a data center; work with legacy services with no change required on the service nodes; support automated commissioning and decommissioning of applications and the service configuration on the service nodes; and support a linear chain of services of arbitrary length.

Figure 4:
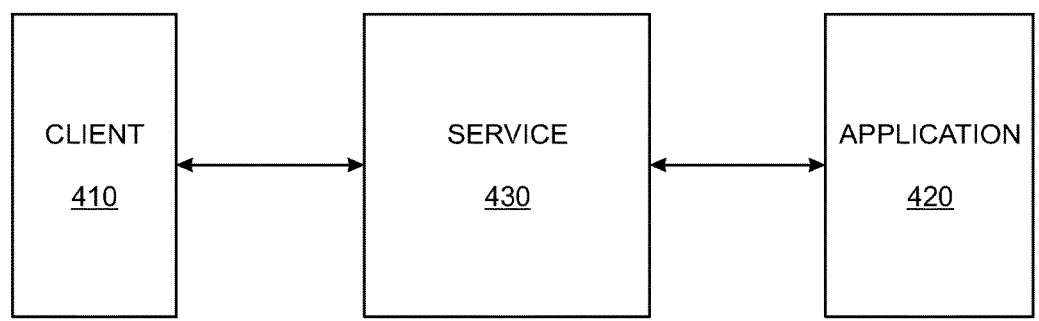
FIG. 4 illustrates an overview diagram of a single-node service graph according to an example embodiment.

Reference is now made to FIG. 4 showing an overview diagram of an example single-node service graph according to an example embodiment. The single node service graph 400 is used in automating the provisioning of services (such as load balancing and firewall) for a client when accessing an application. An "application" as used herein can include an application or virtual workload running on a server, a cloud, a cluster of devices, a computer, or other network device, as should be apparent to those ordinarily skilled in the art. When a client 410 is accessing an application 420, it is desirable to dynamically allocate network and service configurations so that the traffic from the client flows through the services 430 in a given order.

Each device provides a device package with a device specification file (for example an XML file) and a device script. A service graph 400 can be created to allocate networking resources when clients and applications are connected to the service graph. A "node" generally refers to an active electronic device, virtual machine, or software element that is attached to a network, and is capable of sending, receiving or forwarding information over a communications channel. In a distributed system, nodes can be clients, servers, resources, virtual appliances, or peers. The nodes of the service graph generally represent functions which are to be applied to the traffic flowing between the client and application. The nodes can be populated into the network (such as fabric 312 in FIG. 3, for example) so that, when a client and an application are connected to the network, the provisioning of services can be automated.

The security rules are also defined by the service graph based upon the security rules for the various devices.

Figure 5:
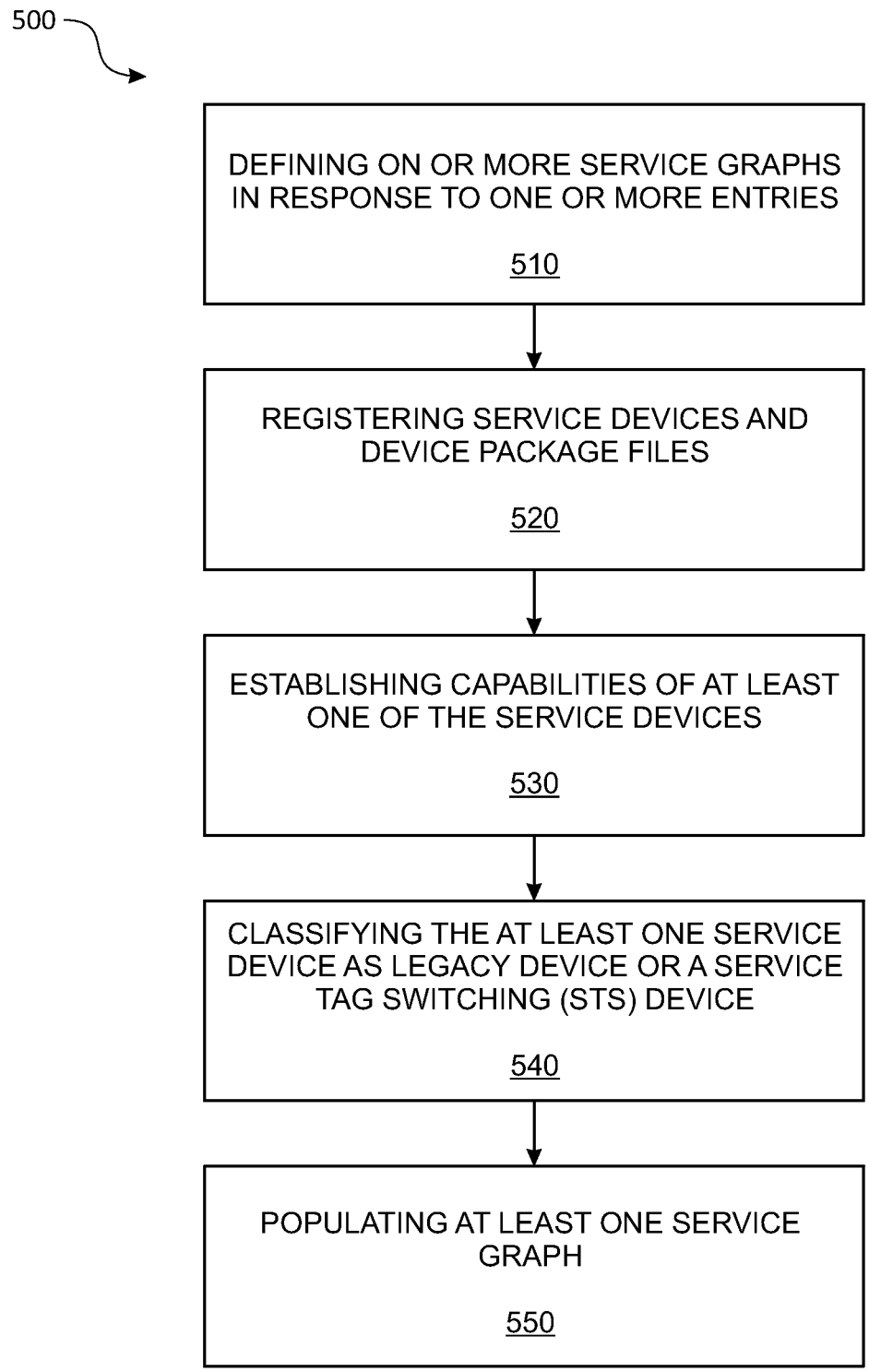
FIG. 5 illustrates a flow chart showing an example method for automating the provisioning of services for a client interacting with an application.

Reference is now made to FIG. 5 showing a flow chart 500 of a method for automating provisioning of services for a client accessing an application so that traffic flowing from the client to an application, and vice versa, flows through the services in a given order. At 510, one or more service graphs are defined by a network administrator. At 520, service devices and their device package files are registered with a controller. The controller can be one or more controller(s) operatively connected to the network and can be a centralized or unifying point of automation and management. In an example embodiment, the controller can be the Cisco Application Policy Infrastructure Controller ("APIC") or an Insieme Fabric Controller (IFC), for example. However, other types of controllers and devices are also contemplated herein.

The package file registered with the controller includes the device specification file (e.g., an XML file) which identifies the device, the functions that it can provide, the configuration needed for the various functions, and networking requirements for various functions. The device package file also includes a device script that enables communication with the device.

At 530, the capabilities of each of the service devices are established by downloading the policies into the network switches. At 540 the service devices are classified as a legacy device or a service tag switching device to determine parameters for the device. At 550 at least one service graph is populated, for example the service graph 600 shown in FIG. 6 and the service nodes are populated in the fabric.

Figure 6:
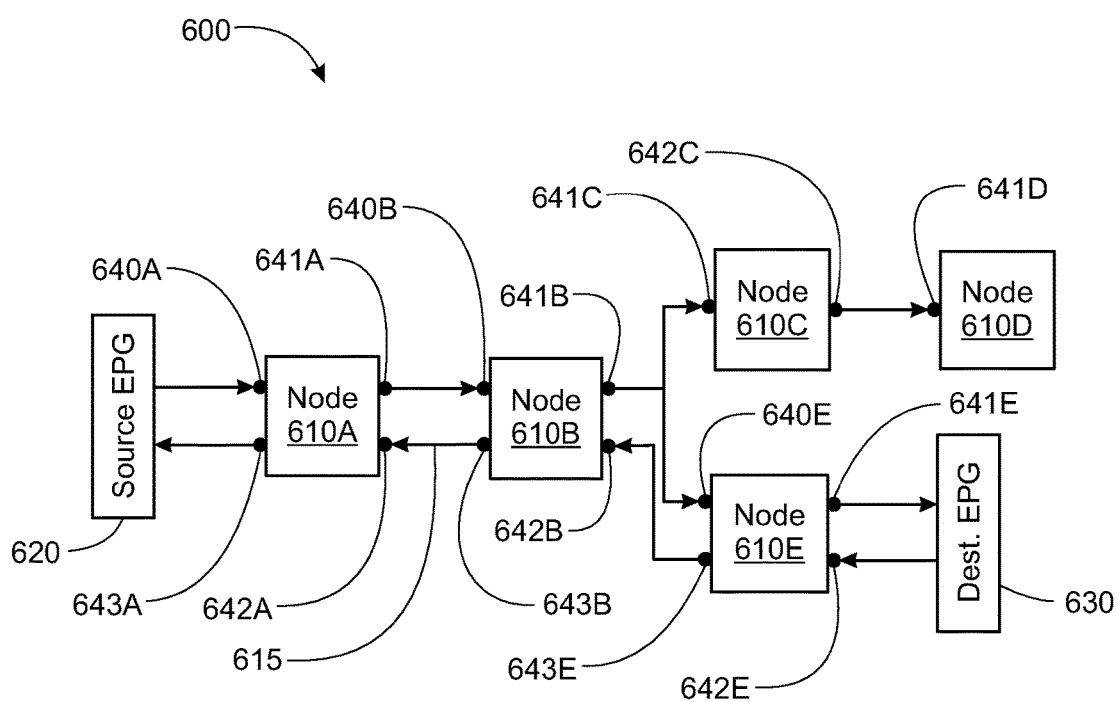
FIG. 6 illustrates a diagram of an example service graph.

Reference is now made to FIG. 6 illustrating a diagram of an example service graph 600. The service graph 600 provides the network and service configuration automatically (for example in accordance with the flows of FIGS. 7-9) so that traffic from a client to an application flows through the services as desired according to a predetermined order. As shown in the service graph 600, there is a source EPG 620 and a destination EPG 630. A source EPG is a single end point or a group of end points that are, or can be, connected to the service graph to enable flow of data to and from the source and destination. The service graph 600 defines the flow of data through service nodes within the graph. Each node 610A, 610B, 610C, 610D and 610E, (collectively the nodes "610") represents a function which is applied to the traffic. A connector represents connectivity for the node and each node can have input and/or output connectors. A connection 615, shown in the diagram as arrows, connects an input connectors to an output connector. Node 610A has "forward" (i.e. flowing from source to destination) input connector 640A, forward output connector 641A, a "reverse" (i.e. flowing from destination to source) input connector 642A and a reverse output connector 643A. Node 610B has a forward input connector 640B, forward output connector 641B, a reverse input connector 642B and a reverse output connector 643B. Node 610C has input connector 641C and output connector 642C. Node 610D has input connector 641D. Node 610E has forward input connector 640E, forward output connector 641E, reverse input connector 642E and reverse output connector 643E. An external connector, such as 642E, connects the graph to the source or destination EPG, such as Destination EPG 630 in this instance. Each node connector can be processed according to a service graph to automate provisioning of services based upon the client and the application connected to the service graph.

Figure 7:
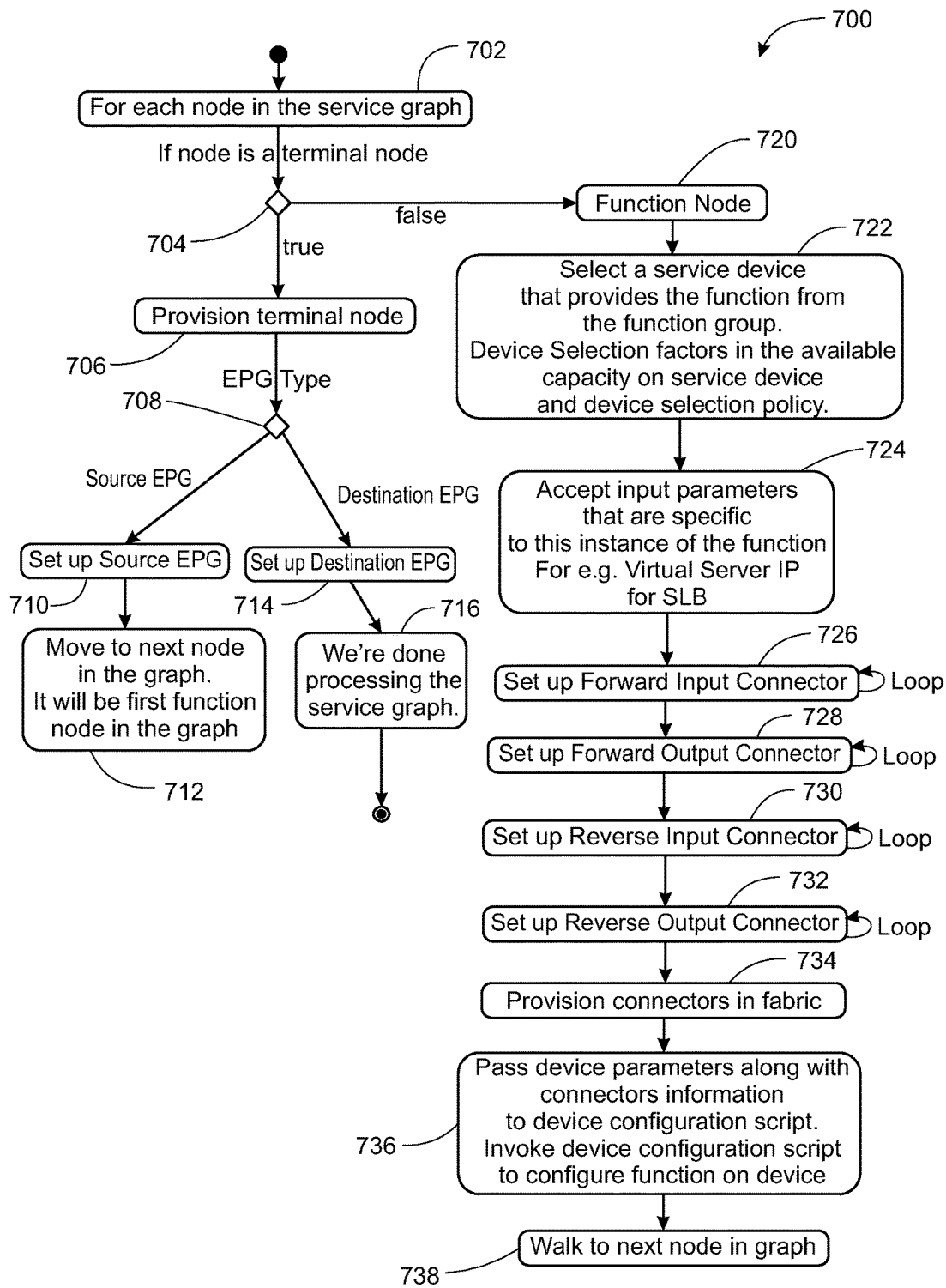
FIG. 7 illustrates a flow chart showing an example method for service graph processing for each node in a service graph.

Reference is now made to FIG. 7 showing a flow chart for service graph processing. For each node in the service graph (for example each node 610A, 610B, 610C, 610D and 610E in FIG. 6) the method 700 is performed for service graph processing. At 702, this method is performed for each node in the service graph. It is determined at 704 if the node is a terminal node. Terminal nodes are, for example, source and destination EPGs, or any point where the traffic "terminates" or reaches its end point.

If the node is a terminal node, at 706 it is provisioned as a terminal mode. At 708, the EPG type is determined as being a source EPG or a destination EPG. If the EPG is a source EPG, at 710 the source EPG is set up and at 712 the processing advances to step 712 to move to the next node in the graph as the first function node in the graph. If the EPG is a destination EPG, at 714 the destination EPG is set up and at 716 the processing advances to step 716 to complete processing the service graph.

If the node is not a terminal node at 704, then it is a function node at 720. A function node represents a discrete function that is available from a service node. At 722, a service device is selected that provides the function from the function group. The controller factors in the available capacity on the service device and the device selection policy to determine device selection. At 724 the input parameters are accepted that are specific to this instance of the function. For example, a virtual server IP address is provided for SLB (server load balancing).

At 726, the forward input connector is set up (see, for example, forward input connector 640A for node 610A in FIG. 6). The forward input connector can be set up by stitching service node's input with fabric in a forward direction. This set-up is continuously looped to configure multiple connectors, one for each input connection in the service graph.

At 728, the forward output connector is set up (see, for example, forward output connector 641A for node 610A in FIG. 6). The forward output connector can be set up by stitching the service node's output with the fabric in a forward direction. This set-up loops to configure multiple connectors, one for each output connector in the service graph.

At 730, the reverse input connector is set up (see, for example, reverse input connector 642A for node 610A in FIG. 6). The reverse input connector can be set up by stitching the service node's input with the fabric in a reverse direction. This set-up loops to configure multiple connectors, one for each output connection in the service graph.

At 732, the reverse output connector is set up (see, for example, reverse output connector 643A for node 610A in FIG. 6). The reverse output connector can be set up, for example, by stitching the service node's output with the fabric in the reverse direction. This set-up loops to configure multiple connectors, one for each output connection in the service graph.

At 734, the connectors are provisioned in the fabric so that the flow in the fabric can be automated from the client to the application to flow though the services. At 736, the device parameters are passed along with the connectors to device configuration script. The device configuration script is invoked to configure the function on the device. At 738, the next node in the graph is accessed to continue graph processing. At this point, all connectors for this node have been initialized and the service device has been configured for the function provided by this node.

The processing of FIG. 7 occurs by the controller, which can be a single controller, more than one controller distributed in location, a cluster of controllers, or any other configuration of controllers. In an example embodiment, the controller can be APIC, or other fabric controller(s) is readily implemented by those having ordinary skill in the art. However, as one of ordinary skill in the art will readily recognize, the processing in FIG. 7 can, in other embodiments, occur in one or more separate devices. For example, the processing can occur by various devices, such as switches, located within the network, such as the network fabric 312. Other implementations are also contemplated where one or more devices can store and propagate information necessary for the provisioning of services as described herein.

Figure 8:
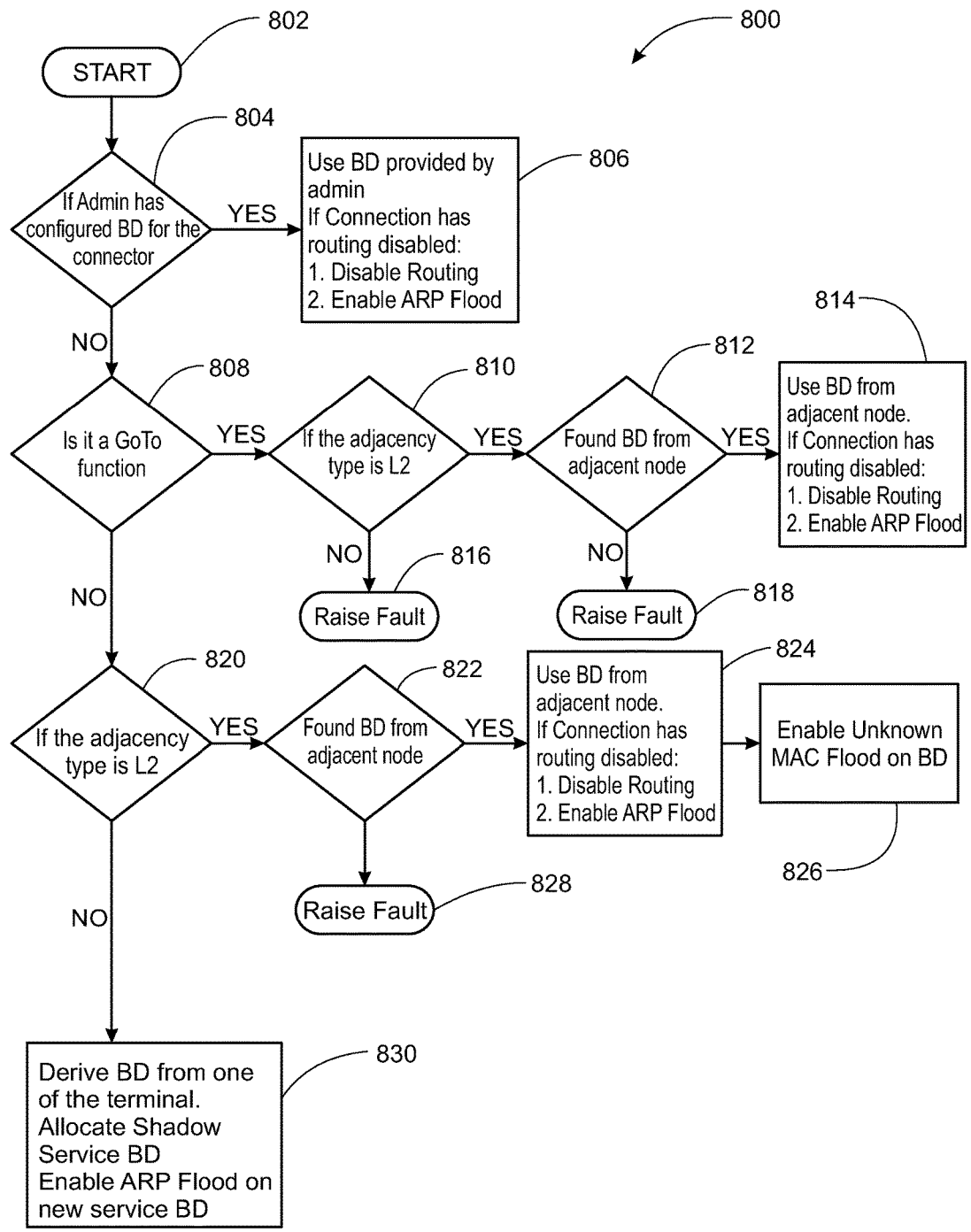
FIG. 8 illustrates a flow chart showing an example method for selection of layer 2 bridge domain logic during graph processing for each connector in a service graph.

FIG. 8 illustrates a flow chart showing a method for selection of layer 2 bridge domain logic during graph processing for each connector in the graph. The method 800 describes the selection of layer 2 bridge domain logic during the graph processing. At 802 the method starts and at 804 determines if the administrator has configured the bridge domain for that connector. If the admin has configured the bridge domain for the connector, at 806 the bridge domain provided by the administrator can be used. If the connection has routing disabled, then disable routing and enable the ARP (Address Resolution Protocol) flood to locate the proper source and destination address and store accordingly. An ARP flood is a "flood" broadcast on a local network (i.e. sent to all devices) to identify and place a source and destination MAC address in the frame for the data.

At 804, if the administrator has not configured the bridge domain for the connector, at 808 it is determined if it is a "GoTo" function. If it is a GoTo function, then at 810 it is determined if the adjacency type is L2 (layer 2), meaning determine if the adjacent node is an L2 node. If not, then a fault is raised at 816. If the adjacency type is L2 at 810, then it is determined at 812 if the bridge domain can be found from the adjacent node. If it cannot be found, at 818 the fault is raised. If it can be found, at 814 the bridge domain from the adjacent node is used. If the connector has routing disabled, then the routing is disabled and ARP flood enabled. At 826, the unknown MAC flood is enabled on the bridge domain.

At 820, if the adjacency type is not L2, meaning the adjacent node is not an L2 device, at 830 derive the bridge domain from one or more of the terminal nodes. The shadow service bridge domain is then allocated and the ARP flood is enabled on the new service bridge domain.

Figure 9:
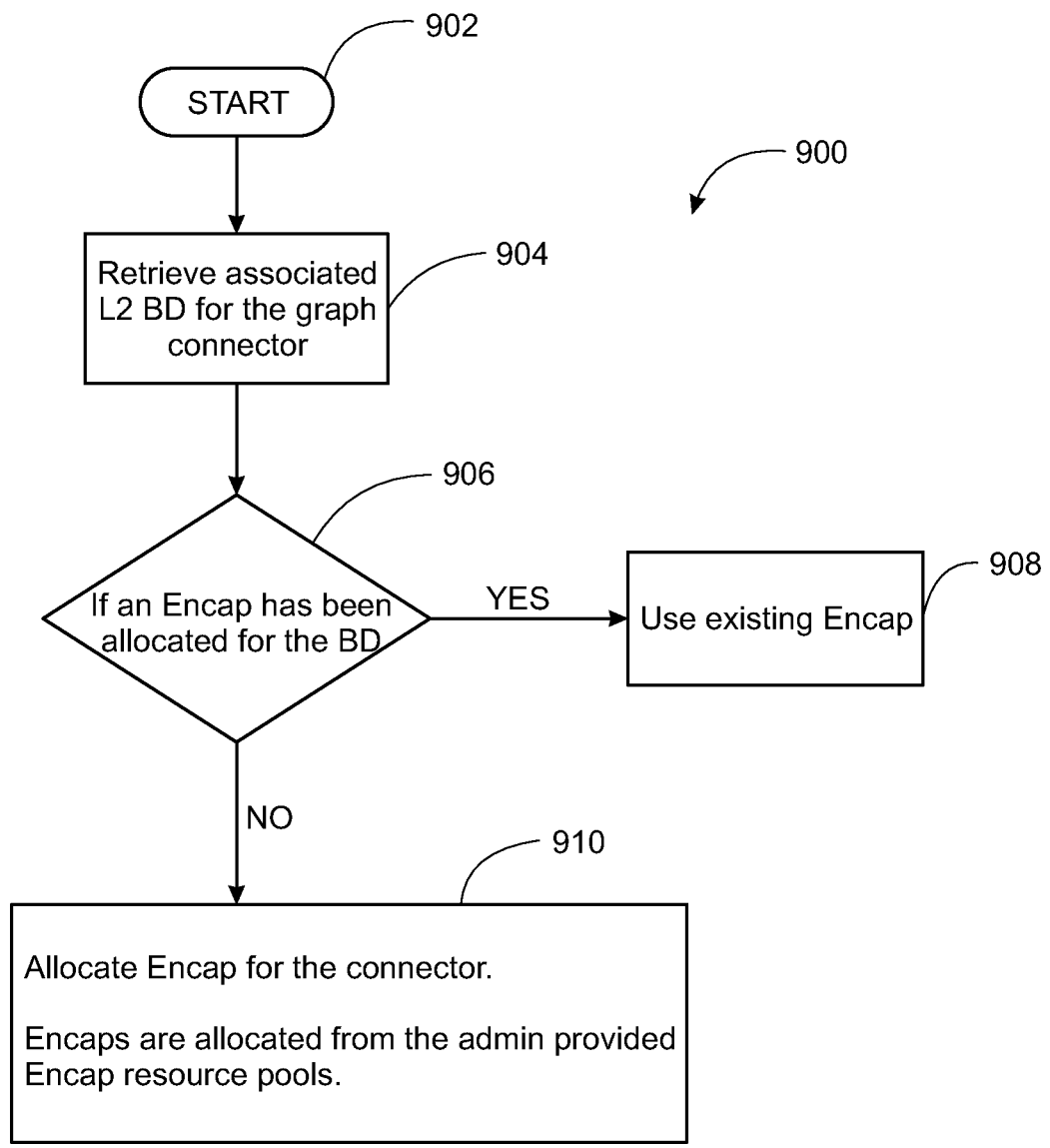
FIG. 9 illustrates a flow chart showing an example method for allocation of networking resources for each connector in the graph.

FIG. 9 illustrates a flow chart showing an example method for allocation of networking resources for each connector in a service graph.

The method 900 starts at 902 and retrieves associated Layer 2 (L2) bridge (BD) domain for the graph connector at 904. If an encapsulation (encap) protocol has been allocated at 906 for the bridge domain, then the existing encapsulation protocol is used at 908. If the encapsulation protocol has not been allocated, then allocate the encapsulation protocol for the connector at 910 and encapsulation protocols are allocated from the administrator provided encapsulation resource pools. Encapsulation protocols include HDLC (High-Level Data Link Control), PPP (Point-to-Point Protocol) or frame relay.

The automation of service provisioning is accomplished by populating service graphs and performing service graph processing in accordance with the methods and example embodiments herein.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set, multiple members of the set or all members of the set satisfy the claim.

The invention claimed is:

1. A method comprising:
   in response to registering one or more service devices, establishing, by a controller, capabilities of the one or more service devices;
   populating, by the controller, a service graph based on the capabilities established for the one or more service devices to outline service provisioning in a network;
   provisioning, based on the service graph, a service in the network to configure one or more nodes in an associated service chain of the service, the information in the service graph specifying at least one of nodes in the associated service chain, capabilities of the nodes in the associated service chain, and a service flow as defined in the service graph for the service; and
   for at least a first node in the service graph, determining that a connector has an unconfigured domain and an existing domain of an adjacent node can be determined.

2. The method of claim 1 further comprising:
   classifying the one or more service devices as one of a legacy service device or a service tag switching device.

3. The method of claim 1 further comprising:
   unconfiguring the one or more nodes in the associated service chain and decommissioning services according to information in the service graph.

4. The method of claim 1 further comprising:
   attaching an endpoint group (EPG) to the service graph.

5. The method of claim 1 further comprising:
   determining that the one or more service devices is a go-through device, a go-to dual media access control (DMAC) device or a go-to Internet Protocol (IP) device.

6. The method of claim 1, further comprising:
   identifying a first terminal node in the service graph; and
   starting with the first terminal node:
      setting up a source End Point Group (EPG) and moving to a next node in the service graph; and
      in response to determining that a destination EPG is reached, completing processing of the service graph.

7. The method of claim 1, further comprising:
   for the first node in the graph, determining one of the one or more service devices is a go-to-function; and
   using the existing domain from the adjacent node to configure the unconfigured domain of the connector.

8. The method of claim 1, further comprising:
   for a first connector in the service graph:
      retrieving associated L2 bridge domain for the first connector; and
      allocating an encapsulation protocol for the first connector.

9. The method of claim 1 wherein the one or more service graphs are defined in response to a request from a client to an application.

10. A controller comprising:
    one or more computer processors; and
    a memory storing instructions that, when executed by the one or more computer processors, cause the controller to:
       in response to registering one or more service devices, establish capabilities of the one or more service devices;
       populate a service graph based on the capabilities established for the one or more service devices to outline service provisioning in a network; and
       provision, based on the service graph, a service in the network to configure one or more nodes in an associated service chain of the service, the information in the service graph specifying at least one of nodes in the associated service chain, capabilities of the nodes in the associated service chain, and a service flow as defined in the service graph for the service, wherein,
    the controller is configured to allocate an encapsulation protocol for a first connector in the service graph.

11. The controller of claim 10, wherein the instructions further cause the controller to:
    classify the one or more service devices as one of a legacy service device or a service tag switching device.

12. The controller of claim 10, wherein the instructions further cause the controller to:

unconfigure the one or more nodes in the associated service chain and decommissioning services according to information in the service graph.

13. The controller of claim 10, wherein the instructions further cause the controller to:
   attach an endpoint group (EPG) to the service graph.

14. The controller of claim 10, wherein the instructions further cause the controller to:
   determine that the one or more service devices is a go-through device, a go-to dual media access control (DMAC) device or a go-to Internet Protocol (IP) device.

15. The controller of claim 10, wherein the instructions further cause the controller to:
   identify a first terminal node in the service graph; and
   starting with the first terminal node:
      set up a source End Point Group (EPG) and moving to a next node in the service graph; and
      in response to determining that a destination EPG is reached, complete processing of the service graph.

16. A non-transitory computer-readable medium storing instructions that, when executed by a controller, cause the controller to:
   in response to registering one or more service devices, establish capabilities of the one or more service devices;
   populate a service graph based on the capabilities established for the one or more service devices to outline service provisioning in a network;
   provision, based on the service graph, a service in the network to configure one or more nodes in an associated service chain of the service, the information in the service graph specifying at least one of nodes in the associated service chain, capabilities of the nodes in the associated service chain, and a service flow as defined in the service graph for the service; and
   for at least a first node in the service graph, determine that a connector has an unconfigured domain and an existing domain of an adjacent node can be determined.

17. The non-transitory computer-readable medium of claim 16, wherein the instructions further cause the controller to: attach an endpoint group (EPG) to the service graph.

18. The non-transitory computer-readable medium of claim 16, wherein the instructions further cause the controller to:
   determine that the one or more service devices is a go-through device, a go-to dual media access control (DMAC) device or a go-to Internet Protocol (IP) device.

19. The non-transitory computer-readable medium of claim 16, wherein the instructions further cause the controller to:
   identify a first terminal node in the service graph; and
   starting with the first terminal node:
      set up a source End Point Group (EPG) and moving to a next node in the service graph; and
      in response to determining that a destination EPG is reached, complete processing of the service graph.

* * * * *